Figures 1, 2:
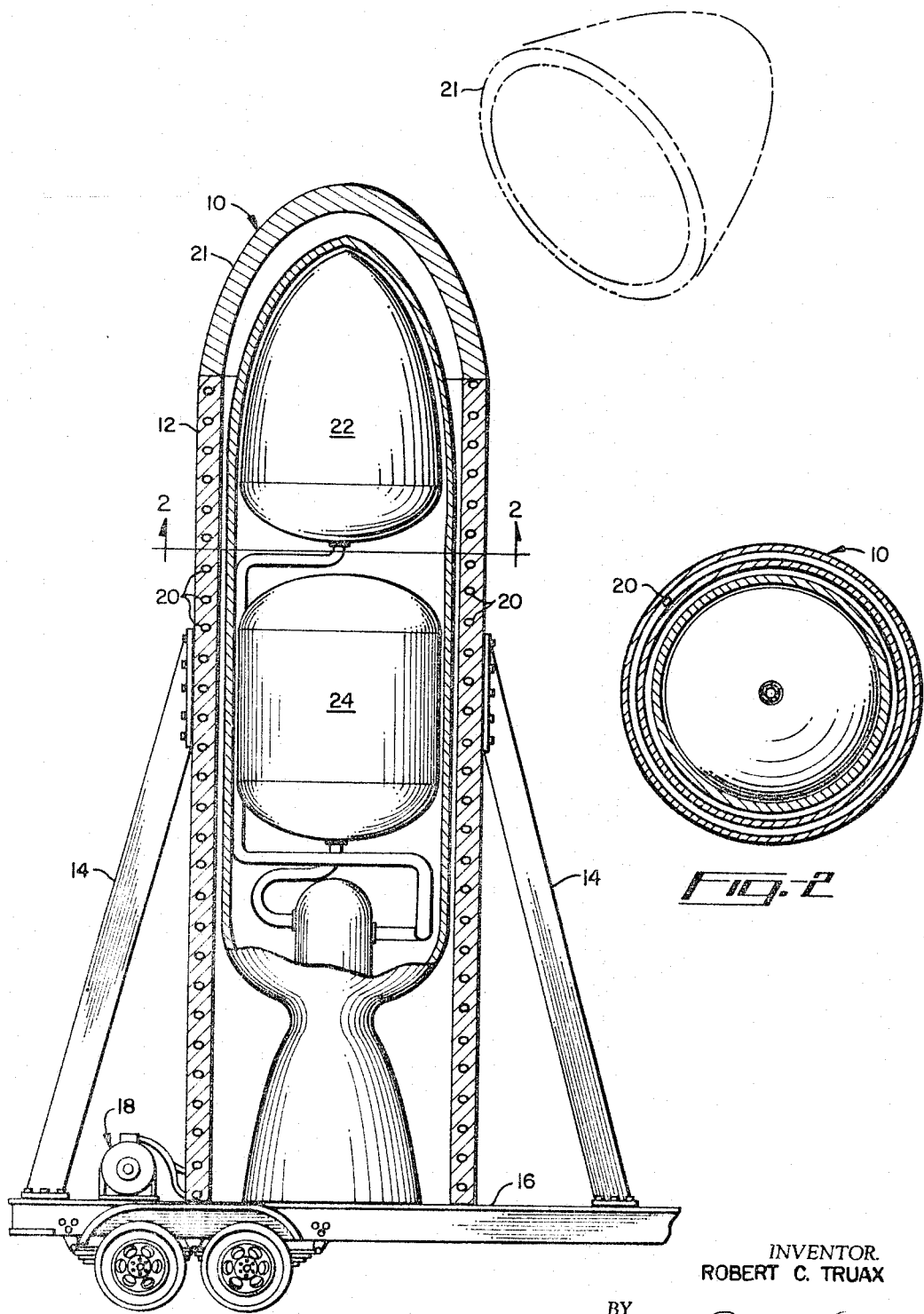

INVENTOR.
ROBERT C. TRUAX

BY

ATTORNEY 3,320,742
PRESSURIZATION SYSTEM AND METHOD FOR EFFECTING PROPELLANT FLOW IN A LIQUID PROPELLANT ROCKET
Robert C. Truax, Shingle Springs, Calif., assignor to Aerojet-General Corporation, Azusa, Calif., a corporation of Ohio
Filed Dec. 4, 1962, Ser. No. 242,257
8 Claims. (Cl. 60—39.48)

This invention relates to a rocket and more particularly to a propellant supply system for a rocket motor.

Liquid propellant rockets employ a liquid feeding apparatus to force propellant from the tanks to the combustion chamber of the rocket motor. Heretofore, the liquid propellants were supplied to the rocket motor by either a pump or by pressurizing the fuel and oxidizer tanks with an auxiliary gas supply. The system of pressurizing the fuel and oxidizer tanks for the purpose of forcing the propellants to the rocket motor reduces the complexity of the propellant supply system. However, such systems require a heavy tank to contain the gas for use as a pressurizing agent. This tank and the compressed gas contained therein impose a serious weight and reliability penalty, thus adversely affecting the performance of the rocket. It is apparent that the performance of a liquid fuel rocket could be substantially improved if means could be found for supplying propellants to the rocket motor without imposing a serious weight and reliability penalty due to high pressure gas requirements. To provide such a propellant supply system comprises an important object of this invention.

This invention in its broadest aspect comprises a liquid propellant rocket wherein a cryogenic or storable fuel and oxidizer are temperature conditioned before firing until the temperature of the propellants produces a vapor pressure which is sufficient to force the propellants to the rocket motor.

This and other objects of this invention will become more apparent when better understood in the light of the accompanying specification and drawings wherein:

FIGURE 1 is an elevational sectional view of a rocket constructed according to the principles of this invention and shown in its launching silo; and FIGURE 2 is a sectional view taken on line 2—2 of FIGURE 1.

Referring now to FIGURE 1 of the drawings, the liquid propellant rocket indicated generally by the reference numeral 10 is shown mounted in a launching silo 12. The silo is maintained in an erect position by means of a support 14 and may be in the ground or mounted on a trailer or train 16 for purposes of mobility. A source of electrical power 18 is provided and this source of electric power is connected to heating elements 20 embedded in the walls of the silo 12 (see FIGURE 2). Alternatively, the heating elements could be wrapped around the propellant tanks in the rocket. In this way, the temperature of the propellant in the rocket 10 can be raised to a predetermined level before firing.

A cap 21 is provided which closes off the top of the silo 12 whereby the rocket inside is protectively sealed against ambient weather conditions. This cap, when the rocket is ready for firing, may be blown off or removed from the silo by any suitable means, as shown in dotted lines.

This invention relies on the fact that vapor is present at a definite pressure in any closed container all but filled with a liquid. If no other gas is present, this vapor pressure is the total pressure in the container. If an attempt is made to lower the vapor pressure by draining off either liquid or vapor, the vapor liquid equilibrium will be upset and more liquid will vaporize, creating additional vapor which tends to counteract the reduction in pressure. In liquids, in order to change the liquid into gas, heat of vaporization is required. In the absence of an external source, this heat is supplied from the internal energy stored in the body of the liquid.

The magnitude of the decrease in pressure during liquid expulsion is a function of the proportion of liquid drained off, and of the properties of the specific propellant. Tests and calculations confirm that one may start with a tank almost completely filled with a liquid, expel all this liquid, and still have remaining in the tank approximately 70% of the initial pressure. Therefore, a liquid filled tank could be heated until the natural vaporization pressure of the liquid is sufficient to force liquid from the tank to the rocket motor. Consequently, using this phenomenon, it is possible to supply a rocket motor with propellant without the use of auxilary pressurization or pump components.

By way of practical example, the fuel tank 22 in rocket 10 may be filled with $LH_2$ (liquid hydrogen) or $$NH_3-N_2H_4$$

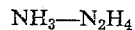

while the oxidizer tank 24 may be filled with an oxidizer such as $N_2O_4$, $N_2O_4+NO$ or $LO_2$ (liquid oxygen). After the fuel and oxidizer tanks are substantially filled, an electric power source 18 is used to heat the elements 20 in the silo until the temperature of the liquid fuel and liquid oxidizer in tanks 22 and 24 is high enough so the resulting vapor pressure can force these propellants to the rocket motor. In the case of cryogenic propellants ($LH_2$ and $LO_2$), the ambient conditions can be used to condition the propellants. Then the cap on the silo is removed and the rocket motor is ignited in the usual manner.

It is apparent that the energy for forcing the liquid fuel and liquid oxidizer to the rocket motor originates in the method of conditioning and does not impose a weight penalty on the rocket. Consequently, the rocket will in most cases have a large mass ratio with a reliability afforded by the simplicity of the system.

The utilization of vapor pressurization for the liquid fuel and oxidizer described in connection with the rocket stage shown in FIGURE 1 can, under some circumstances, restrict the performance of the rocket. This is because some liquid fuels are vapor pressure limited due to low critical pressures or large reductions in liquid density. Consequently, the utilization of the propulsion system described in connection with the rocket stage shown in FIGURE 1 provides the greatest rocket performance for upper stage applications.

It is to be understood that the form of the invention herewith shown and described is to be taken as a preferred example of the same, and that various changes in the shape, size and arrangement of the parts may be resorted to without departing from the spirit of this invention or the scope of the claims.

I claim:
1. A pressurization system for a liquid propellant rocket having a combustion chamber to effect propellant flow into the combustion chamber, comprising a pair of closed containers each substantially filled with, respectively, a liquid oxidizer and a liquid fuel, means for controllably heating said containers so that the vapor pressure therein will be increased to a selected value, and means connecting said containers to the combustion chamber of said rocket whereby said liquid oxidizer and said liquid fuel will be ejected from their respective containers by the vapor pressures present therein into the combustion chamber of said rocket.

2. A method of operating a liquid propellant rocket having a combustion chamber and first and second closed containers respectively containing liquid oxidizer and liquid fuel communicating with the combustion chamber, said method comprising the steps of producing vapor pressures in said first and second containers derived solely from the vaporization of said liquid oxidizer and liquid fuel of respective magnitudes sufficient to force the liquid oxidizer and liquid fuel into the combustion chamber by raising the temperature of the liquid oxidizer and the liquid fuel in said first and second containers, and forcing liquid oxidizer from the first container and liquid fuel from the second container into the combustion chamber by the vapor pressures present in said first and second containers.

3. In combination, a silo, a liquid propellant rocket having a combustion chamber, said liquid propellant rocket being mounted in said silo, an electric power source, heating elements in said silo connected to said electric power source whereby the temperature in said silo and in the liquid propellant rocket can be controlled, said liquid propellant rocket including a first closed container substantially filled with a storable liquid oxidizer, a second closed container substantially filled with a storable liquid fuel, and conduits respectively connecting said first and second closed containers to the combustion chamber, whereby when said electric power source increases the temperature in said silo by energizing said heating elements, the increase in the vapor pressures in said first and second closed containers is high enough to force said oxidizer and said fuel through said conduits to said combustion chamber.

4. A pressurization system for a liquid propellant rocket having a combustion chamber to effect propellant flow into the combustion chamber, comprising a first closed container substantially filled with $N_2O_4$ serving as a storable liquid oxidizer, a second closed container substantially filled with a storable liquid fuel, conduits respectively connecting said first and second closed containers to the combustion chamber, and means for increasing the vapor pressure in said first and second closed containers to a value high enough to force the oxidizer and the fuel through said conduits to the combustion chamber.

5. A pressurization system for a liquid propellant rocket having a combustion chamber to effect propellant flow into the combustion chamber, comprising a first closed container substantially filled with liquid oxygen serving as an oxidizer, a second closed container substantially filled with a liquid fuel, conduits respectively connecting said first and second closed containers to the combustion chamber, and means for increasing the vapor pressure in said first and second closed containers to a value high enough to force the oxidizer and the fuel through said conduits to the combustion chamber.

6. A pressurization ssytem for a liquid propellant rocket having a combustion chamber to effect propellant flow into the combustion chamber, comprising a first closed container substantially filled with a liquid oxidizer, a second closed container substantially filled with liquid hydrogen serving as a fuel, conduits respectively connecting said first and second closed containers to the combustion chamber, and means for increasing the vapor pressure in said first and second closed containers to a value high enough to force the oxidizer and the fuel through said conduits to the combustion chamber.

7. A pressurization system for a liquid propellant rocket having a combustion chamber to effect propellant flow into the combustion chamber, comprising a first closed container substantially filled with a storable liquid oxidizer, a second closed container substantially filled with a mixture of $NH_3$ and $N_2H_4$ serving as a storable liquid fuel, conduits respectively connecting said first and second closed containers to the combustion chamber, and means for increasing the vapor pressure in said first and second closed containers to a value high enough to force the oxidizer and the fuel through said conduits to the combustion chamber.

8. A pressurization system for a liquid propellant rocket having a combustion chamber to effect propellant flow into the combustion chamber, comprising a first closed container substantially filled with a storable liquid oxidizer, a second closed container substantially filled with a storable liquid fuel, conduits respectively connecting said first and second closed containers to the combustion chamber, and means for increasing the vapor pressure in said first and second closed containers to a value high enough to force the oxidizer and the fuel through said conduits to said combustion chamber, the vapor pressures present in said first and second closed containers being derived solely from the vaporization of said liquid oxidizer and said liquid fuel in said respective first and second closed containers; and said means for increasing the vapor pressure in said first and second closed containers comprising at least one heating element operably associated therewith, and means to energize said heating element to raise the temperature of the liquid oxidizer and liquid fuel in said first and second closed containers.

References Cited by the Examiner

UNITED STATES PATENTS

| | | |
|---|---|---|
| 2,526,221 | 10/1950 | Goddard. |
| 2,784,560 | 3/1957 | Johnson _____ 62—55 X |
| 2,964,916 | 12/1960 | Keeping _____ 62—55 X |
| 3,082,666 | 3/1963 | Fitzpatrick et al. _____ 60—35.6 |
| 3,122,891 | 3/1964 | Thomas _____ 89—1.7 |
| 3,143,855 | 8/1964 | Abild _____ 60—39.48 X |

MARK NEWMAN, *Primary Examiner.*

SAMUEL FEINBERG, SAMUEL LEVINE, *Examiners.*

CARLTON R. CROYLE, G. L. PETERSON, D. HART,
*Assistant Examiners.*